United States Patent

[11] 3,598,449

| [72] | Inventor | Henry Replin |
| | | 110 S. Dexter St., Denver, Colo. 80222 |
| [21] | Appl. No. | 876,538 |
| [22] | Filed | Nov. 13, 1969 |
| [45] | Patented | Aug. 10, 1971 |

[54] TIRE TRUEING MEANS
6 Claims, 4 Drawing Figs.

| [52] | U.S. Cl. | 301/5 B |
| [51] | Int. Cl. | B60b 13/00 |
| [50] | Field of Search | 301/5 B; 85/35, 53; 151/55, 56; D8/272, 274 |

[56] References Cited
UNITED STATES PATENTS

| 2,529,420 | 11/1950 | Ramquist | 85/53 |
| 2,801,883 | 8/1957 | Householder | 301/5 B |
| 3,012,820 | 12/1961 | King | 301/5 BA |
| 3,047,339 | 7/1962 | Hammer | 301/5 B |
| 3,207,557 | 9/1965 | Hunter | 301/9 X DN |

Primary Examiner—Richard J. Johnson
Attorney—Bertha L. MacGregor

ABSTRACT: Motor vehicle tire trueing means for automatically correcting imbalance in a tire on a wheel fastened to the vehicle axle by a plurality of lugs and nuts, comprising a series of annular weights, one mounted on each lug nut, and resilient means between each annular weight and the nut on which it is mounted. The trueing means may be an annular weight in the form of a steel ring having a central opening and a groove in the surface defining the opening, and a resilient O-ring in the groove for engaging the nut, or it may be a heavy metal ring mounted on a resilient sleeve which engages the nut.

PATENTED AUG 10 1971 3,598,449
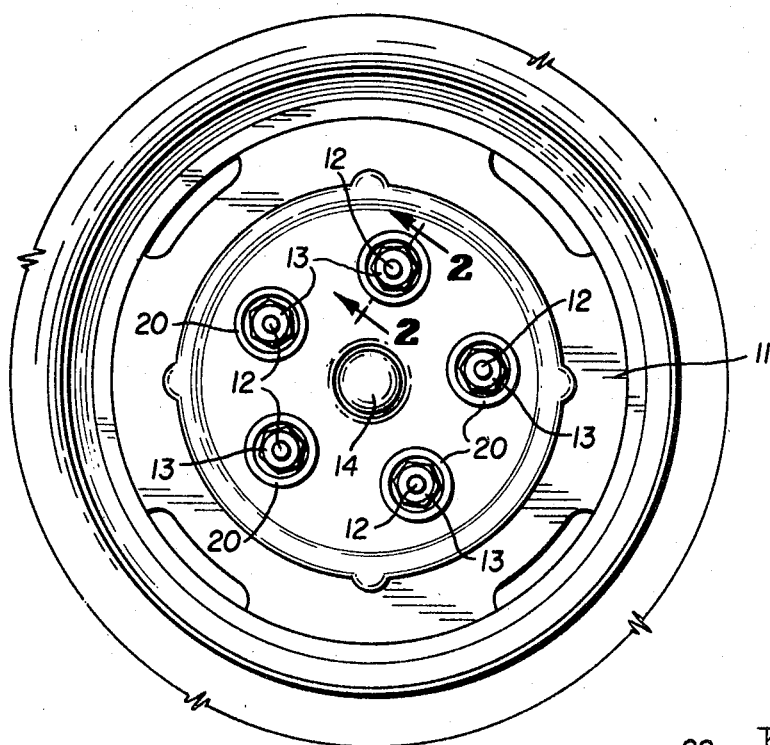
Fig_1
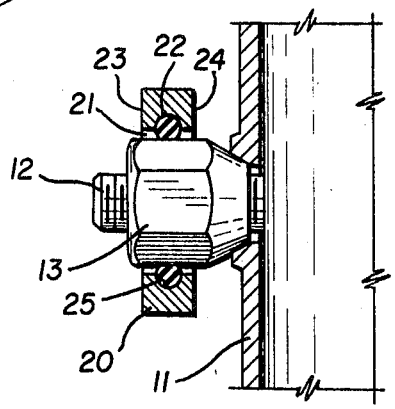
Fig_2
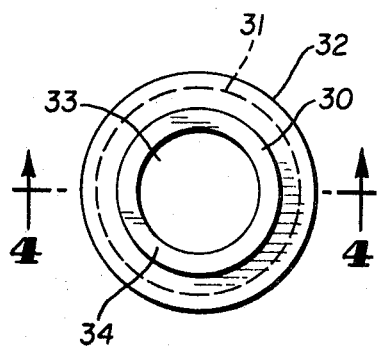
Fig_3
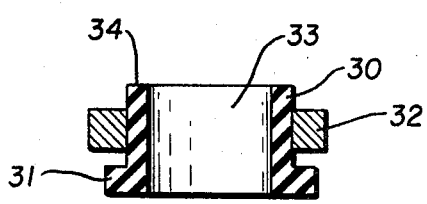
Fig_4
INVENTOR.
HENRY REPLIN
BY
Bertha L. MacGregor
ATTORNEY

TIRE TRUEING MEANS

This invention relates to tire trueing means, which may be called orbital balancers, designed to eliminate unbalance from automobile tires.

In the manufacture of automobile tires, several plies or layers of rubberized cord fabric or other suitable material are arranged in layers and then shaped into tire form. The building and shaping is followed by a vulcanizing procedure in which the shaped tire is placed into a mold which is subjected to hydraulic pressure in heated ovens. In building tires, the several plies or layers of material are not always of uniform depth or density and although the shaping and vulcanizing impart to the tires the appearance of uniform thickness and form, the actual density and weight of the material in the tire may vary and cause unbalanced weight in the tire. Under influence of centrifugal force when in use, the tire bows out in the area of greater weight, producing what may be termed a high spot. When designated high spot or area of greater weight in the tire contacts the road, in the travel of the vehicle, a compressive wave starts across the tire in a direction away from the road, that is, away from the part of the tire which then constitutes the "footprint" or road contacting area. This force, or shock, is transmitted to the lug nuts of the wheel on which the tire is mounted which causes the lug nuts to move upwardly.

The tire trueing means or orbital balancers of my invention are mounted on the lug nuts of the wheel, one on each nut. When the compressive wave in the tire is produced by the high spot or bowed out part of the tire contacting the road, the orbital balancers remain in their original positions, due to their yielding mounting on the lugs, thereby causing a reaction force to be transmitted back to the footprint of the tire. This in turn causes an increase in the length of time that the heavy part of the tire is contacting the road surfaces, and hence that part of the tire is subjected to more wear than the rest of the tire. This wear gradually removes rubber from the tire at the out-of-balance area, causing the tire to rebalance itself.

In the drawings:

FIG. 1 is an elevational side view of a vehicle wheel and tire, showing the tire trueing means embodying my invention applied to the five lug nuts of the wheel.

FIG. 2 is a sectional view, on an enlarged scale, in the plane of the line 2-2 of FIG. 1.

FIG. 3 is an elevational side view of a modified form of tire trueing device embodying the invention, on a scale larger than FIG. 1.

FIG. 4 is a sectional view, in in the plane of the line 4-4 of FIG. 3.

In the embodiment of the invention shown in FIGS. 1 and 2, a conventional automobile tire is mounted on an automobile wheel 11 fastened in conventional manner to a vehicle axle by five bolts 12 and lug nuts 13. The axle shaft is designated 14.

The tire trueing means comprise a plurality of ring form balancers 20 equal in number to the lug nuts 13 employed in mounting the wheel on the vehicle axle. Each balancer 20 is a steel ring having a concentric opening 21 extending through the ring, the opening being slightly larger than the diameter of the lug nut 13, as shown in FIG. 2. The surface of the ring 20 which defines the central opening 21 is provided with an annular groove 22 midway between the major side surfaces 23, 24, of the ring, for reception of an O-ring 25 which fits snugly in the groove 22 and projects into the opening 21.

The dimensions of the balancers 20 constituting sets of trueing means vary to fit the size of the lug nuts of different vehicle wheels. One example of the devices shown in FIGS. 1 and 2 has the following dimensions: Outside diameter of the ring 20 is 1½ inches; diameter of opening 21 is 1 inch; thickness of ring three-eighths inch; depth of groove 22 about one-sixteenth inch. The O-ring 25 is made of rubber or other resilient material, and its thickness is approximately one-eighth inch, so that when the O-ring is positioned in the groove 22, it fits snugly therein and protrudes into the central opening 21 of the metal ring 20. Thus the resilient O-ring 25 contacts the peripheral surface of the lug nut 13 as shown in FIG. 2.

The modified construction shown in FIGS. 3 and 4 comprises a resilient cylindrical sleeve 30 which may be provided with a flange 31 extending radially from the sleeve 30 near one end thereof, and a ring 32 of heavy metal, such as lead, snugly engaging the external surface of the sleeve 30 between the flange 31 and the unflanged end of the sleeve. The dimensions of the parts may vary, but the internal diameter of the central opening 33 is such that the resilient sleeve fits snugly on the lug nuts of the vehicle wheel 11, and the heavy metal ring 32 fits snugly on the sleeve 30. The assembly is applied to each lug nut so that the end surface 34 contacts the side of the wheel and the flange 31 faces outwardly from the wheel.

It is to be understood that the series of orbital balancers of my invention which are resiliently mounted on each of the lug nuts of the wheel do not have any relationship with the ordinary stationary balancers mounted on vehicle wheels. The latter merely correct imbalance in the wheel without affecting imbalance in the tire which may be mounted on the wheel. The orbital balancers automatically correct imbalance in the tire due to their yielding mounting on the lug nuts and the reaction of the tire under centrifugal influence when the heavier area of the tire becomes the footprint and contacts the road in the travel of the vehicle.

It is also to be understood that the invention is applicable not only to automobile wheels but also to other motor-driven vehicles though described herein as applied to automobile wheels and tires.

I claim:

1. Motor vehicle tire trueing means for automatically correcting imbalance in a tire on a wheel fastened to the vehicle axle by a plurality of lugs and nuts, comprising a series of annular weights, one mounted on each lug nut, and resilient means surrounding each nut and disposed between each annular weight and the nut on which it is mounted permitting each weight to yield relatively to each respective lug nut in response to centrifugal forces.

2. The tire trueing means defined by claim 1, in which the resilient means between each annular weight and the nut on which it is mounted is a resilient O-ring.

3. The tire trueing means defined by claim 1, in which the annular weight is provided with a central opening and an annular groove in the surface defining the opening, and in which the resilient means between each annular weight and the nut on which it is mounted is a resilient O-ring mounted in the groove and extending into the opening.

4. The tire trueing means defined by claim 1, in which each annular weight surrounds a lug nut, and each resilient means snugly engages and surrounds a lug nut.

5. The tire trueing means defined by claim 1, in which the annular weight is provided with a concentric opening and in which the resilient means between the annular weight and the nut on which it is mounted is a resilient sleeve snugly engaging the nut.

6. The tire trueing means defined by claim 5, in which the resilient sleeve is provided with a radially extending flange adjacent one end of the sleeve.